(12) United States Patent
Carney

(10) Patent No.: US 10,724,195 B2
(45) Date of Patent: Jul. 28, 2020

(54) AQUATIC CURTAIN DEVICE AND USES THEREOF

(71) Applicant: Gary Richard Carney, Spanish (CA)

(72) Inventor: Gary Richard Carney, Spanish (CA)

(*) Notice: Subject to any disclaimer, the term of this patent is extended or adjusted under 35 U.S.C. 154(b) by 187 days.

(21) Appl. No.: 15/673,708

(22) Filed: Aug. 10, 2017

(65) Prior Publication Data

US 2018/0044871 A1 Feb. 15, 2018

Related U.S. Application Data

(60) Provisional application No. 62/373,907, filed on Aug. 11, 2016.

(51) Int. Cl.
*E02B 9/02* (2006.01)
*E02B 15/06* (2006.01)
(Continued)

(52) U.S. Cl.
CPC .................. *E02B 3/02* (2013.01); *E02B 5/02* (2013.01); *E02B 5/085* (2013.01); *E02B 9/02* (2013.01);
(Continued)

(58) Field of Classification Search
CPC ...... E02B 15/06; E02B 15/0814; E02B 5/085; E02B 5/087; E02B 3/02; E02B 9/02; E02B 9/04
(Continued)

(56) References Cited

U.S. PATENT DOCUMENTS 3,456,265 A * 7/1969 Carnahan ................ E02B 15/08
4/487
3,653,214 A 4/1972 Woody, Jr.
(Continued)

FOREIGN PATENT DOCUMENTS

JP 62041812 A * 2/1987

OTHER PUBLICATIONS

"Silt Curtains, Turbidity Barriers and The Particulate Control System (PCS)", Gunderboom, downloaded from the Internet at http://www.gunderboom.com/PDFfiles/Turbidity%20Barriers,%20PCS%20and%20CPCS . . . pdf on Dec. 4, 2018.
(Continued)

*Primary Examiner* — Frederick L Lagman
(74) *Attorney, Agent, or Firm* — John H. Choi & Associates

(57) ABSTRACT

Aquatic curtain devices and methods for forming waterway channels and reducing waterway maintenance are disclosed. Each curtain device comprises an elongated float and an elongated flexible curtain depending from a first side of the elongated float. The curtain has a bottom end with a weight extending along the entire length of the elongated float. The float is configured to be sufficiently buoyant to support the curtain in an upward direction. Each curtain device is configured for the curtain to remain in a substantially taut state when in use and accommodate fluctuations in water levels, such that the elongated weight remains on the bottom of the waterway while the elongated float remains on the surface. Artificial channels are constructed by selecting the length of the elongated float to achieve the desired channel dimensions using two or more curtain devices positioned along a desired path in a waterway.

18 Claims, 6 Drawing Sheets

(51) Int. Cl.
*E02B 3/02* (2006.01)
*E02B 9/04* (2006.01)
*E02B 5/02* (2006.01)
*F03B 13/08* (2006.01)
*E02B 5/08* (2006.01)
*E02B 15/08* (2006.01)
*F03B 17/06* (2006.01)

(52) U.S. Cl.
CPC ............ *E02B 9/04* (2013.01); *E02B 15/0814* (2013.01); *F03B 13/08* (2013.01); *F03B 17/06* (2013.01); *E02B 5/087* (2013.01); *F05B 2220/32* (2013.01); *F05B 2220/706* (2013.01); *F05B 2240/12* (2013.01); *F05B 2240/124* (2013.01); *F05B 2260/63* (2013.01); *Y02E 10/28* (2013.01)

(58) Field of Classification Search
USPC .......................................................... 405/63
See application file for complete search history.

(56) References Cited

U.S. PATENT DOCUMENTS

| | | | |
|---|---|---|---|
| 4,100,746 A | 7/1978 | Preus | |
| 4,201,495 A * | 5/1980 | Preus | E02B 15/08 405/63 |
| 4,534,675 A * | 8/1985 | Morrisroe | E02B 3/043 405/24 |
| 4,688,024 A * | 8/1987 | Gadde | F41H 11/05 256/1 |
| 5,310,283 A * | 5/1994 | Berg | E02B 15/08 405/63 |
| 5,348,419 A | 9/1994 | Bailey et al. | |
| 5,362,180 A * | 11/1994 | Canning | E02B 15/08 405/63 |
| 5,522,674 A * | 6/1996 | Cooper | E02B 15/08 210/242.1 |
| 5,553,972 A * | 9/1996 | Bergeron | E02B 3/02 405/52 |
| 5,688,075 A * | 11/1997 | Gradek | E02B 15/06 405/63 |
| 5,807,024 A * | 9/1998 | Benedict | E02B 3/18 256/12.5 |
| 5,893,978 A * | 4/1999 | Yoda | C02F 7/00 210/747.6 |
| 5,961,251 A * | 10/1999 | Prendergast | E02B 3/043 405/24 |
| 6,485,229 B1 * | 11/2002 | Gunderson, III | E02B 15/08 405/63 |
| 8,807,869 B1 * | 8/2014 | Lee | E02B 15/06 405/27 |
| 9,284,704 B2 | 3/2016 | Carney | |
| 2001/0048851 A1 * | 12/2001 | Dreyer | E02B 15/08 405/63 |
| 2002/0172560 A1 * | 11/2002 | Dreyer | E02B 15/06 405/63 |
| 2003/0082006 A1 * | 5/2003 | Dreyer | E02B 15/08 405/63 |
| 2012/0251243 A1 * | 10/2012 | Smith | E02B 15/046 405/26 |
| 2015/0225915 A1 * | 8/2015 | Carney | E02B 5/085 405/84 |

OTHER PUBLICATIONS

"Turbidity Curtain Variety", GEI Works, downloaded from the Internet at https://www.silt-barriers.com/turbiditycurtain.html on Dec. 4, 2018.

* cited by examiner

FIG. 5
PRIOR ART
FIG. 6
PRIOR ART
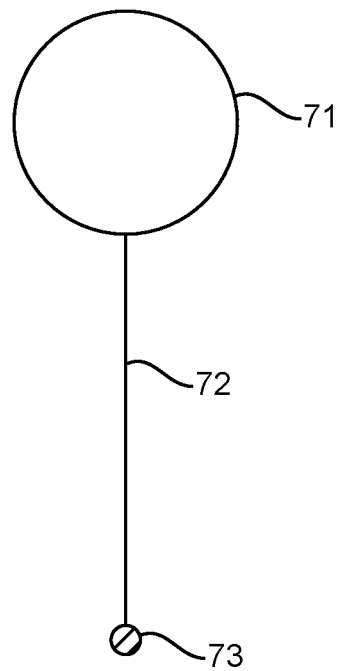
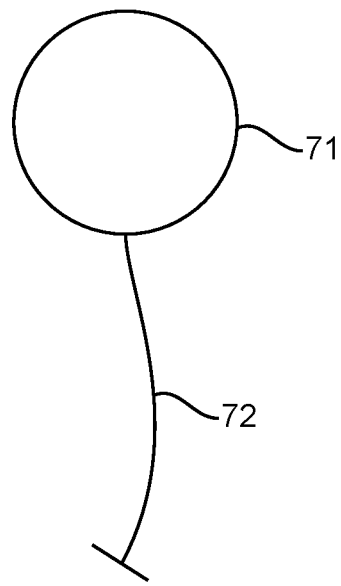
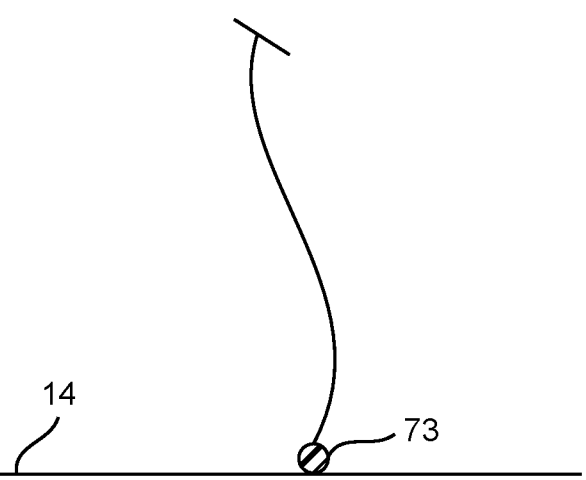

AQUATIC CURTAIN DEVICE AND USES THEREOF

FIELD OF THE INVENTION

The present invention relates generally to the field of aquatic curtain devices and methods for keeping water channels clear of silt so as to remain navigable and help manage current flow.

BACKGROUND OF THE INVENTION

Waterways such as rivers or other bodies of water often contain natural channels whose depth is sufficient for safe navigation. Over time, however, natural channels tend to accumulate silt on their bottoms, thereby reducing their depth. Given enough time, river action, tidal action and the cumulative effect of different weather conditions, a channel can become so silted as to render it unfit for navigation. In order to keep channels navigable, dredging is used to reduce the amount of silt on the bottom of the channel. However, due to the action of water currents, an area wider than the area used for navigation must be dredged to be effective. As a result, even if the desired channel is only 10 or 20 meters wide, a path 30 meters or more wide would need to be dredged to ensure that the central 10 or 20 meters is clear. In many cases, water currents and tidal action cause the rapid accumulation of silt, necessitating almost annual dredging of the channel. Building walls around the channel would be too expensive, and would likely fail due to hydro-dynamic forces. Therefore, a less expensive and simple method of keeping navigation channels free from silt is required.

One possible solution to reduce the need for dredging in waterways is the use of aquatic curtains. There are generally two types of curtain configurations known in the art. One is a floating suspension type curtain which does not extend to the bottom of the waterway. By sitting above the bottom of a waterway, key objectives are to promote the more efficient settling of suspended particles to the bottom of the waterway (from where they were previously disturbed as a result of man-made activity) and to minimize negative impacts on natural aquatic systems.

Another known curtain configuration is a floating curtain which is staked or similarly anchored to the bottom of a waterway. Such curtain systems tend to include a significant excess of curtain slack to compensate for wave turbulence and other water level fluctuations. This can result in significant leakage. When used to bind off bodies of water on either side of the curtain barrier, one way to minimize leakage is to use anchoring and curtain segment attachment mechanisms, as disclosed in U.S. Pat. No. 4,100,746. The application of such known curtain devices is generally limited to containment to prevent the movement of material and fluid from a contained body of water to facilitate various activities. For example, Triton Turbidity Curtains by GEI Works can be used to facilitate dredging, construction and dock/harbour maintenance. These kinds of curtain devices, however, do not provide or facilitate the transport of silt and similar debris from one bottom area of a waterway to another bottom area or to the bank of a waterway.

There are also known curtain devices which allow for the filtration of suspended particles to prevent their passage across the curtain barrier, while allowing for the passage of water through the curtain (e.g., Gunderboom aquatic filter barrier systems). Given the objective of material containment, these kinds of curtain devices are not designed to support the creation of navigable artificial channels within natural waterways, that can also remain free of silt build-up (i.e., be self-cleaning). Moreover, such known curtain devices are, typically, physically attached to the bottom of a waterway in order to withstand extreme water forces when performing their filtration function.

Accordingly, known curtain configurations present certain disadvantages and limitations with respect to: i) silt and current flow management in waterways, ii) supporting the improved navigation of waterways where different entry and exit points into an artificial channel, or bound off body of water may be required; and iii) the leveraging of current/water flow in a waterway as a resource, for example, to generate hydroelectric power.

With the foregoing in view, and other advantages as will become apparent to those skilled in the art, the invention is herein described by reference to the accompanying drawings forming a part hereof and certain exemplary embodiments.

SUMMARY OF THE INVENTION

The present invention relates generally to aquatic curtain devices and methods of deploying said devices to form channels in waterways to minimize undesirable silt build-up in regions of a waterway, and thereby sustainably support a multitude of economic activities, such as:
   a. access to and ease of watercraft navigation in a waterway;
   b. minimization of waterway bank erosion by redirecting faster water through aquatic curtain channels;
   c. environmental management of water quality; and
   d. increasing the velocity of water flow in a waterway to support hydro power generation.

It is an object herein to provide a device and method for forming a channel in a waterway having a surface, a depth and a bottom. The channel formed will be self-cleaning and thereby minimize or eliminate the need for dredging. The method comprises the steps of providing a fixed channel curtain device and positioning said device along a desired path in the waterway. The fixed channel curtain device comprises an elongated cylindrical float having a length and a first side. An elongated flexible curtain depends from the first side of the elongated cylindrical float and extends along the entire length of the elongated cylindrical float. The elongated curtain has a bottom end opposite where the elongated curtain depends from the elongated cylindrical float. An elongated weight is formed on the bottom end of the elongated curtain, the elongated weight extending along the entire length of the elongated cylindrical float. The elongated cylindrical float is configured to be sufficiently buoyant to float the device. The length of the elongated float is selected to equal a desired length to facilitate the construction of a channel using one or more curtain devices. The height of the elongated flexible curtain is selected to be approximately equal to the depth of the waterway, such that the elongated weight remains on the bottom while the elongated cylindrical float remains on the surface and the curtain remains taut as water levels fluctuate.

In accordance with one aspect there is provided a device for forming a channel in a waterway to prevent the buildup of silt on a bottom of the waterway, the device comprising:
   a. an elongated cylindrical float having a length and a first side;
   b. an elongated flexible curtain depending from the first side of the elongated cylindrical float and extending along the entire length thereof, the elongated curtain having a bottom end opposite where the elongated curtain depends from the elongated cylindrical float;

c. an elongated weight formed on the bottom end of the elongated flexible curtain, the elongated weight extending along the entire length of the elongated cylindrical float, wherein the elongated weight is sufficiently heavy to anchor the device to a selected position at the bottom of the waterway and the elongated cylindrical float is configured to remain at the surface and maintain the elongated flexible curtain substantially taut and at a height approximately equal to the depth of the waterway, as water levels fluctuate.

In accordance with another aspect there is provided a method of forming a channel in a waterway having a surface, a depth and a bottom, the method comprising the steps of:

a. providing a fixed channel curtain device comprising:
   i. an elongated cylindrical float having a length and a first side;
   ii. an elongated flexible curtain depending from the first side of the elongated cylindrical float and extending along the entire length thereof, the elongated curtain having a bottom end opposite where the elongated curtain depends from the elongated cylindrical float;
   iii. an elongated weight formed on the bottom end of the elongated flexible curtain, the elongated weight extending along the entire length of the elongated cylindrical float and being sufficiently heavy to anchor the fixed channel curtain device to a selected position at the bottom of the waterway;
b. selecting the height of the elongated flexible curtain to remain substantially taut and approximately equal to the depth of the waterway as water levels fluctuate; and
c. placing the fixed channel curtain device along a desired path to define a part of the channel.

In accordance with still another aspect there is provided a device for forming a channel in a waterway to prevent the buildup of silt on a bottom of the waterway, the device comprising:

a. an elongated cylindrical float having a length and opposite first and second sides;
b. an elongated flexible curtain attached to the first side of the elongated cylindrical float along a first attachment line, the elongated flexible curtain depending from the first side of the elongated cylindrical float and extending along the entire length thereof, the elongated curtain having a bottom end opposite where the elongated curtain depends from the elongated cylindrical float;
c. an elongated weight formed on the bottom end of the elongated flexible curtain, the elongated weight extending along the entire length of the elongated cylindrical float and being sufficiently heavy to anchor the device to a selected position at the bottom of a waterway; and
d. an elongated ballast weight formed on the second side of the elongated cylindrical float along a second attachment line opposite the first attachment line, wherein the elongated ballast weight, elongated cylindrical float and the elongated flexible curtain are configured to permit the elongated cylindrical float to freely rotate between a first position wherein the elongated ballast weight is oriented vertically below the first attachment line, and a second position wherein the first attachment line is oriented vertically below the elongated ballast weight, the elongated ballast weight being sufficiently heavy to bias the elongated float towards the first position of the elongated float.

In accordance with a further aspect there is provided a method of forming a channel in a waterway having a current, a surface, a depth and a bottom, the method comprising the steps of:

a. providing a fixed channel curtain device comprising:
   i. an elongated cylindrical float having a length and a first side;
   ii. an elongated flexible curtain attached to the first side of the elongated cylindrical float along a first attachment line, the elongated flexible curtain depending from the first side of the elongated cylindrical float and extending along the entire length thereof, the elongated curtain having a bottom end opposite where the elongated curtain depends from the elongated cylindrical float;
   iii. an elongated weight formed on the bottom end of the elongated flexible curtain, the elongated weight extending along the entire length of the elongated cylindrical float and being sufficiently heavy to anchor the fixed channel curtain device to a selected position at the bottom of the waterway;
   iv. an elongated ballast weight formed on the second side of the elongated cylindrical float along a second attachment line opposite the first attachment line;
b. selecting the height of the elongated flexible curtain to remain at a height approximately equal to the depth of the waterway as water levels fluctuate;
c. placing the fixed channel curtain device along a desired path to define part of one side of a channel, the desired path oriented such that the fixed channel curtain device extends coordinate within the current such that the current flows along and parallel to the elongated flexible curtain, wherein the elongated ballast weight, elongated cylindrical float and the elongated flexible curtain are configured to permit the elongated cylindrical float to freely rotate between a first position wherein the elongated ballast weight is oriented vertically below the first attachment line, and a second position wherein the first attachment line is oriented vertically below the elongated ballast weight, the elongated ballast weight being sufficiently heavy to bias the elongated float towards the first position of the elongated float.

In yet another aspect there is provided an artificial aquatic channel constructed within a waterway, oriented such that the entry point for the channel is directionally coincident with the natural current of the waterway, and comprising fixed channel curtain devices positioned in an end to end, overlapping configuration to form a series of fixed channel curtain devices defining one side of the channel in the waterway.

In various embodiments the channel formed according to the disclosure may be constructed of series or pairs of fixed channel curtain devices oriented in substantially parallel and converging configurations to modulate water flow and the deposit of silt and similar debris to a selected region(s) of a waterway. In other embodiments, one side of a channel may be extended with one or more fixed channel curtain devices, optionally angled to divert water flow and the deposit of silt and similar debris to a selected region(s) of a waterway.

In yet a further aspect there is provided a system for generating power comprising:

a. an artificial aquatic channel constructed in a waterway using one or more fixed channel curtain devices for directing and modulating the current of water passing through the channel; and
b. a hydro turbine positioned in the path of the current of water passing through the channel.

In a related aspect there is provided a method for generating power, the method comprising the steps of forming an artificial aquatic channel for directing and modulating the current of water passing through a hydro turbine, using one or more fixed channel curtain devices.

In one embodiment of the method, the artificial aquatic channel is a converging channel formed by a series of one or more fixed channel curtain devices wherein each series comprises two or more devices positioned in an overlapping configuration.

In another embodiment of the method, the hydro turbine is a movable, in-stream turbine.

BRIEF DESCRIPTION OF THE DRAWINGS

These and other features of the invention will become more apparent in the following detailed description in which reference is made to the appended drawings.

FIG. 5 is a schematic representation of a suspension type aquatic curtain device known in the art.

FIG. 6 is a schematic representation of a bottom staked or anchored type aquatic curtain device known in the art.

In the drawings like characters of reference indicate corresponding parts in the different figures.

DETAILED DESCRIPTION OF THE INVENTION

Figure 1:
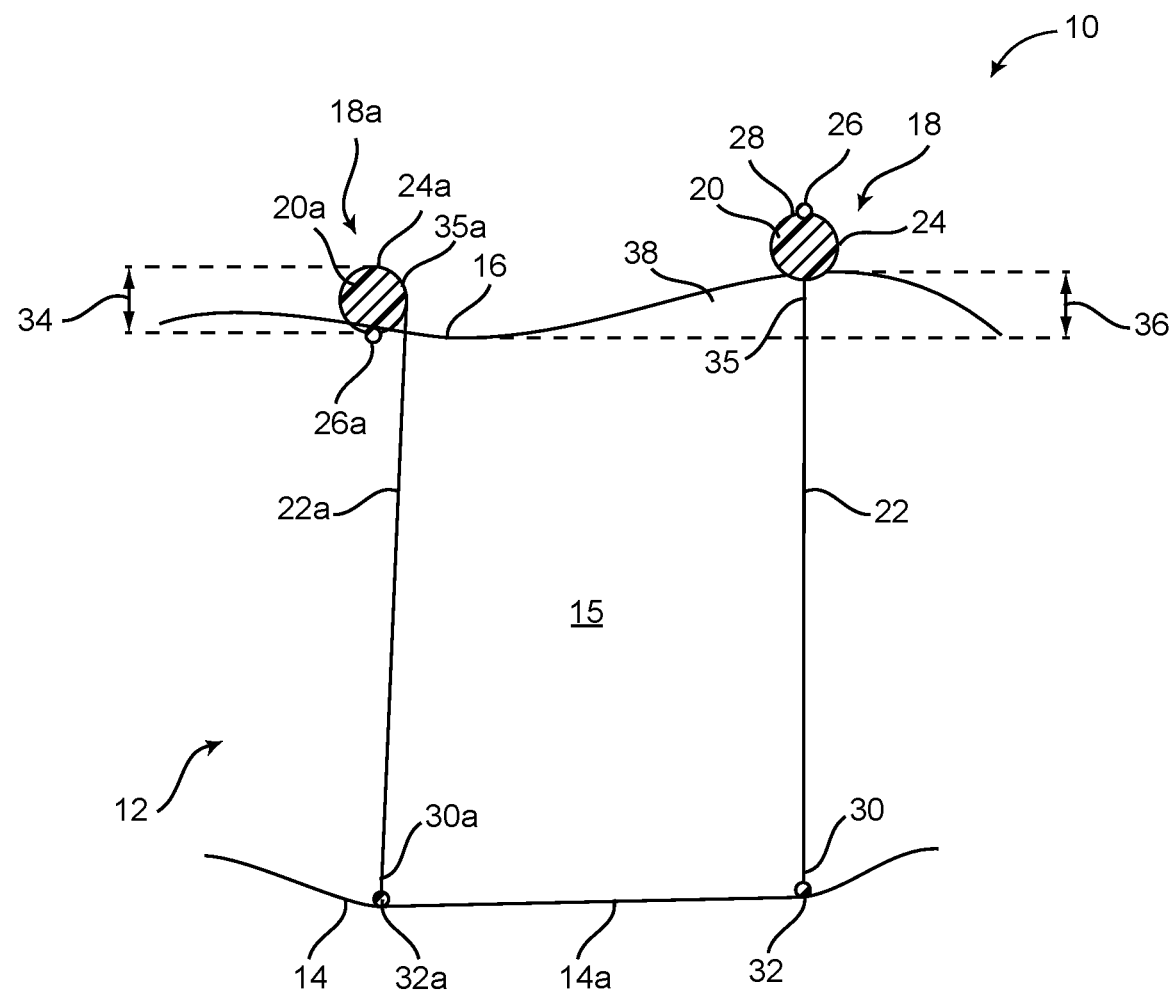
FIG. 1 is a cross sectional view of aquatic curtain devices and a channel constructed using the aquatic curtain devices and method according to the present disclosure.

The present disclosure generally relates to aquatic curtain devices which can be easily and economically constructed, and methods of using said devices for effective waterway navigation, and for water resource management.

By contrast to known configurations of aquatic curtains, as represented by FIG. 5, which consist of a float 71, suspended fabric or mesh 72 of a predetermined length and a weight 73, the curtain devices of the present disclosure are designed to extend down the full depth of the body of water they are deployed into. Extending the height of the curtain to be essentially equal to the depth of the waterway minimizes the movement of water under the curtain device to effectively segregate two areas of water, and thereby form, for example, an artificial channel within a natural waterway.

Furthermore, by contrast to other known configurations of aquatic curtains, as represented by FIG. 6, which consist of a float 71*a*, an excess of suspended fabric or mesh 72*a* and an anchor weight 73*a*, the curtain devices of the present disclosure are designed to deploy only the amount of curtain material needed to remain substantially taut when in use, in response to changing water levels and flow conditions. This overcomes the leakage deficiencies of known curtain devices with excess amounts of curtain slack (intended to compensate for wave turbulence and fluctuations) by preventing the flow of water around the sides of curtain devices between the float and anchor.

Definitions

Unless defined otherwise, all technical and scientific terms used herein have the same meaning as commonly understood by one of ordinary skill in the art to which this invention belongs.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, use or method, denotes that additional elements and/or method steps may be present, but that these additions do not materially affect the manner in which the recited composition, method or use functions. The term "consisting of" when used herein in connection with a composition, use or method, excludes the presence of additional elements and/or method steps. A device, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

As used herein, the term "fixed" with reference to (channel) curtain devices means that the curtain device has the combination of features, such as buoyancy, strength and anchor weight to maintain its position at the bottom of a waterway without the use of pins, chains or other means (otherwise referred to herein as extraneous hardware) to attach the device to the bottom of the waterway. The configuration of a fixed curtain device when deployed in a waterway comprises a float and weight attached at opposite ends to a curtain which remains substantially taut and at a height approximately equal to the depth of the waterway as water levels fluctuate. It will be appreciated by one skilled in the art, that such a configuration requires the weight of the fixed curtain device to be sufficiently heavy to anchor the device at a selected position at the bottom of the waterway. While the float should be buoyant enough to remain at the surface of the waterway, it will be appreciated by one skilled in the art that more extreme fluctuations in water levels may cause the float to become temporarily submerged from time to time.

As used herein, the term "waterway" denotes any body of water of interest as a resource for economic activity and/or as a site for environmental stewardship. Waterways may include, for example, rivers, lakes, bays, straits, canals, channels and inlets. Navigable waterways are bodies of water which lend or could lend themselves to the use of watercraft.

Curtain Device

The curtain devices provided for herein are designed and constructed to have effective water barrier or segregation functionalities when deployed into a waterway and can be used for a variety of applications. The design and construction avoids the use of excess materials, and/or extraneous hardware which can damage watercraft or other structures near or at the surface of the waterway while also allowing for easy access between segregated bodies of water.

Referring to FIG. 1, a method and system for forming navigation channels in a waterway is disclosed. The system, shown generally as item 10, comprises a pair of fixed channel curtain devices 18 and 18a which are strategically placed in waterway 12. Waterway 12 may be any potentially navigable or otherwise useful waterway having a bottom 14 and a surface 16 with a depth between the bottom and surface of sufficient dimension to permit the passage of water vehicles. Fixed channel curtain devices 18 and 18a are placed along waterway 12 parallel to each other to form navigation channel 15. The width of channel 15 is determined by the distance separating curtain devices 18 and 18a. Channel curtain devices 18 and 18a are identical and each comprises an elongated cylindrical float 20 and 20a, respectively, to which a flexible curtain 22 and 22a is attached, respectively. Curtains 22 and 22a depend from attachment points 24, and 24a positioned on one side of floats 20, and 20a, respectively. Lower ends 30, and 30a are formed on curtains 22 and 22a, respectively, to which elongated weights 32, and 32a are attached. Curtains 22, and 22a and weights 32, and 32a extend the entire length of elongated floats 20, and 20a, respectively. Ballast weights 26 and 26a are formed on floats 18, and 18a, opposite attachment points 24, and 24a, respectively. Ballast weights 26 and 26a are sufficiently heavy so that when floats 18, and 18a are floated on water surface 16, the ballast weights 26 and 26a will tend to rotate the floats so that the ballast weights 26 and 26a are oriented downward, as illustrated with device 18a.

In one embodiment, elongated cylindrical floats 20 and 20a comprise elongated cylinders of expanded polyethylene or other similar materials, as is used, for example, in the construction of "pool noodles". In another embodiment, the floats may be constructed as hollow tubes with closed ends using various plastic materials or other materials as known in the art. One skilled in the art will be able to select the most appropriate float material and construction for the application intended.

Elongated floats 20 and 20a are made as long as may be required (several meters) to be used in the building of navigable channels. Flexible curtains 22 and 22a can be made from an artificial fabric material which is inexpensive, strong and resistant to rotting and decay. In one embodiment, the curtain portion of the device is constructed of fabric which resists the flow of water through it. In another embodiment, the curtain portion of the device is constructed of waterproof fabric. Suitable fabrics are of a tight woven or non-woven construction. For example, several fabrics commonly used in construction and landscaping applications, and other kinds of materials that could be readily selected by one skilled in the art can be utilized.

Figure 3:
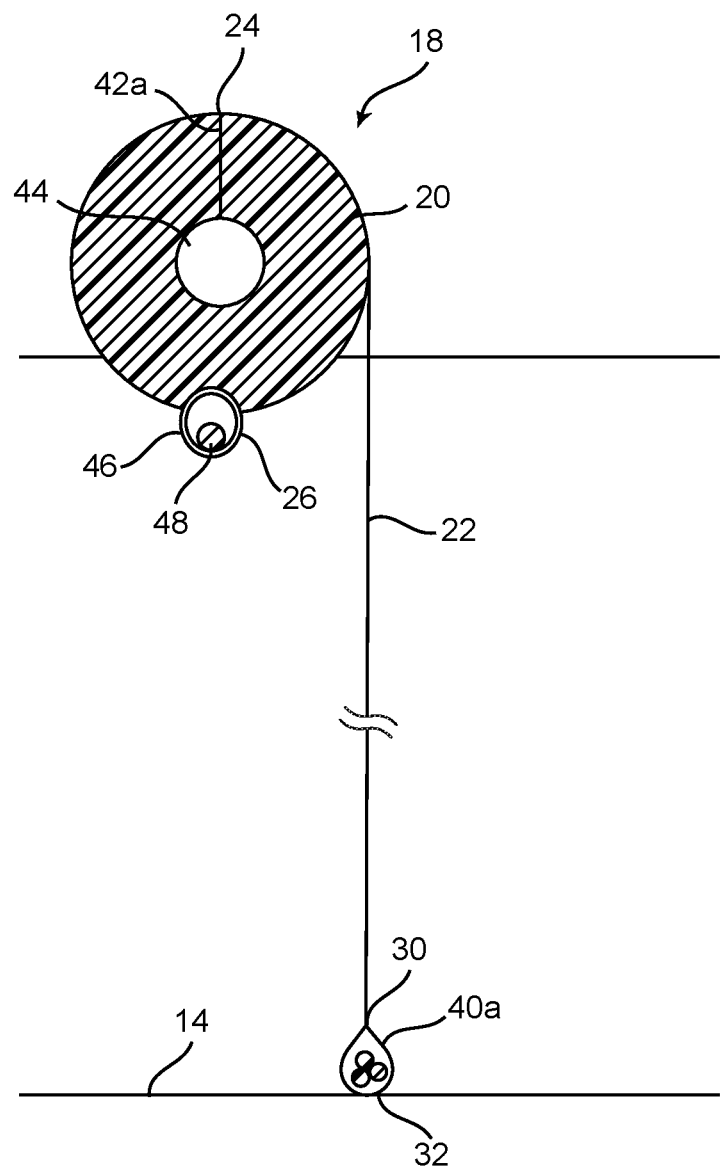
FIG. 3 is a cross sectional view of an aquatic curtain device according to the present disclosure.

Weights 32 and 32a are formed on bottom ends 30 and 30a of curtains 22 and 22a by means known generally in the art. As seen in FIG. 3, an elongated pocket 40a is formed on the bottom end of the fabric curtain 22 and one or more elongated weights is inserted therein. Pocket 40a can be formed by sewing or bonding or by other means known generally in the art. Elongated weight 32 comprises a length of rebar which has been treated to be rust resistant, although any elongated and relatively heavy member may be used. The weight of weight 32 can be selected to be large or sufficient enough to ensure that bottom end 30 of curtain 22 remains at bottom 14, to withstand the buoyancy of the float 20, as well as wave action, illustrated as the differential in water levels 16 and 38, even if water currents or flash floods act on the curtain. If a single piece of rebar is insufficient to anchor device 18 to bottom 14, then as many as three or more individual pieces of rebar can be joined together in a parallel arrangement by the means of bindings (not shown) and used in place of a single rebar weight.

In one embodiment, the configuration of the curtain device is such that the curtain is affixed to and cooperates with the float to ravel and unravel about the float and remain substantially taut as the water level and flow of the waterway fluctuates. Accordingly, the amount of curtain material (fabric) used to construct the curtain portion of the curtain device must be sufficient to allow for the curtain height to ravel and unravel about the float so that its height can be selected and deployed to be approximately equal to the depth of the waterway, by way of the operation of the device in response to changing fluid forces and conditions.

With reference to FIG. 3, curtain 22 is secured to float 20 by means known generally in the art. In one embodiment, as mentioned above, float 20 may consist of a length of "pool noodle" material, in which case curtain 22 can be secured by forming a slit 42a part-way through the float to central cavity 44 and then bonding an end of the curtain within the slit. Several suitable waterproof adhesives, and other suitable bonding agents and methods familiar to those skilled within the art can be used to affix the end of curtain 22 within slit 42a. Slit 42a forms attachment point 24 which is positioned on the side of float 20 opposite ballast weight 26.

In an alternative embodiment, the curtain may be secured to the float at attachment point 24 by way of surface fastening points provided for on the float and complementary fastening means provided for on the end of the curtain. For example, in the case of a float which is constructed as a plastic tube, surface fastening points may be constructed as protrusions or loops. In still another embodiment the curtain fabric may be wrapped around the float or encase it, be bonded to the surface of the float and then stitched onto itself at attachment point 24.

Ballast weight 26 can consist of a length of rebar which is bonded to the surface of float 20 by means known generally in the art. Alternatively, ballast weight 26 can consist of an elongated plastic tube 46 which is bonded to float 20 and which contains a length of rebar 48. Ballast weight 26 should be heavy enough to rotate float 20 such that the ballast weight is submerged and attachment point 24 is clear of the water. Ballast weight 26 can be selected to ensure that float 20 can float freely and support fabric curtain 22, however in all cases the weight 32 should be sufficiently heavy to remain on the bottom of the waterway irrespective of changes in water level and current fluctuations. While with more extreme changes in water volume and flow rate, the float 20 may become from time to time temporarily submerged, the weight 32 should be designed to reliably remain in its desired position of placement on the bottom of the waterway. The circumference of float 20 and counterbalance 48, are sized and weighted in accordance to draft or free-board as required to be most effective throughout adverse fluid motion conditions, such as changing or excessive wave action, current velocity fluctuations and flooding.

Referring back to FIG. 1, positioning attachment points 24 and 24a opposite ballast weights 26 and 26a, respectively, ensures that the action of waves (or water level changes) do not cause the curtain to be dislodged from bottom 14. As waves sweep past the elongated floats, the elongated floats will rise and fall. The height of curtains 22 and 22*a* are selected so that the float of each device remains at surface 16. Waves, such as wave 38, will cause floats 20 and 20*a* to rise and fall as the wave sweeps through. When wave 38 lifts the float, as shown in the case of float 20, the "upper end" 35 of curtain 22 which is partially wrapped around the float is exposed as the float rotates so that weight 26 is oriented upwards. This has the net effect of temporarily increasing the effective length of curtain 22 resulting in less lifting forces being applied to weight 32. Likewise, when wave 38 passes (as is the case with float 20*a*), the float lowers, causing weight 26*a* to rotate and effectively wrap upper end 35*a* of curtain 22*a* partially around float 20*a*. This has the effect of shortening curtain 22*a*. Floats 20 and 20*a* can therefore rotate in response to waves having an amplitude of 36, which is approximately equal to diameter 34 of the floats.

The net effect is that curtain devices 18 and 18*a* effectively absorb the energy of wave action without transferring it to their anchoring weights. This keeps the floats visible on the surface 16 and also ensures that the anchoring weights are not slowly dislodged as a result of wave action. Furthermore, seasonal changes in water level can be partially compensated for by the rotation of the elongated floats.

Again, this keeps the floats visible on the surface while also helping to keep the curtain devices at their desired position and anchored to the bottom of the waterway.

Methods of Using Curtain Device(s)

In one embodiment the curtain device according to the present disclosure can be used to bound off or segregate bodies of water. In a related embodiment the current device may be used to form an artificial channel within a natural waterway. The channel may be formed by placing one or more curtain devices at a desired distance from the bank of a waterway, wherein one side of the channel is defined by the one or more curtain devices and the other side of the channel is defined by the bank of the waterway. Alternatively, the sides or boundaries of the artificial channel may be defined by positioning two or more curtain devices spaced apart from one another within the waterway.

Figure 2:
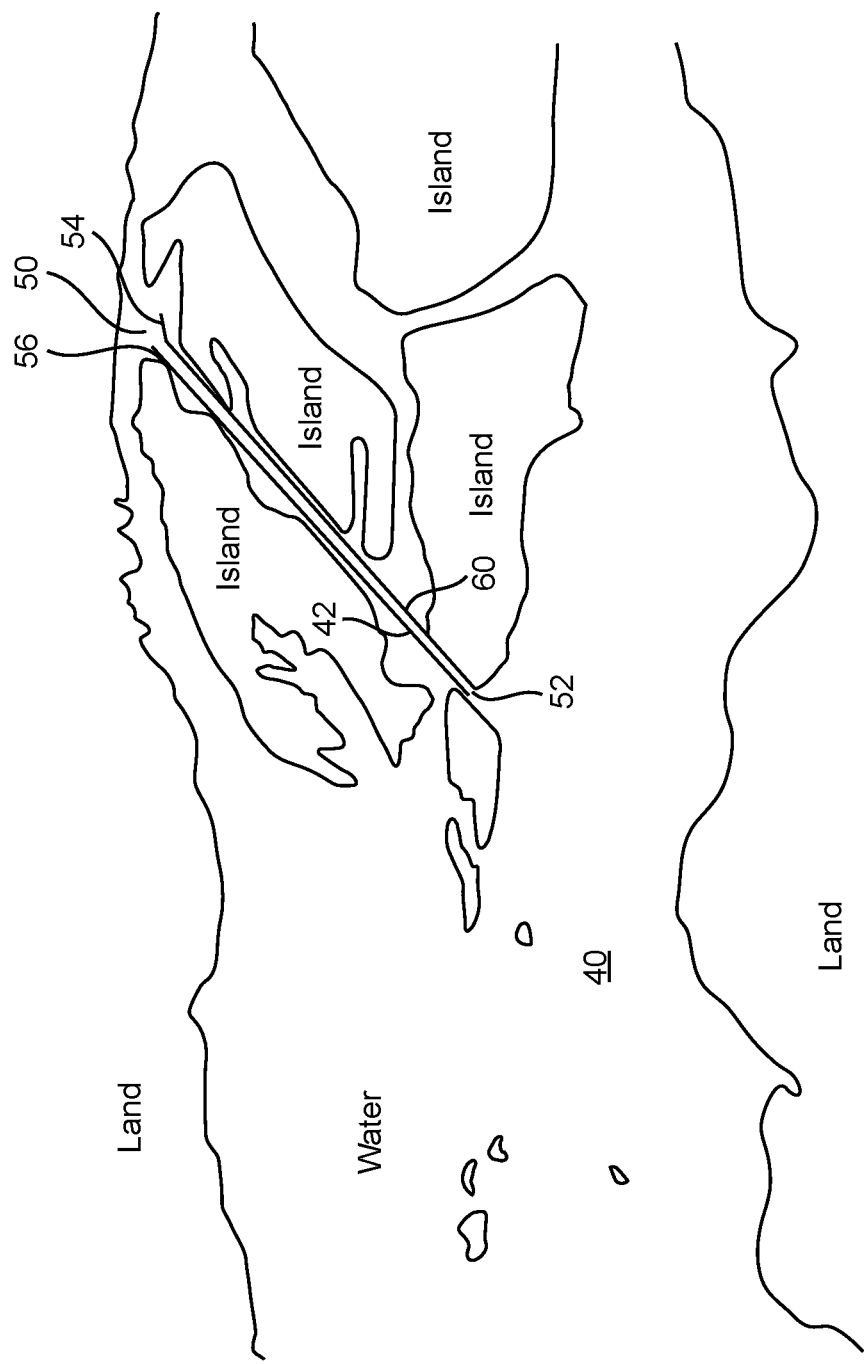
FIG. 2 is a schematic view of channels on a geographic map of a water way, the channels being constructed using the aquatic curtain devices and method according to the present disclosure.

As shown in FIG. 1, channel 15 is formed by placing curtain devices 18 and 18*a* in the correct or in a desired orientation in a waterway. The orientation of the curtain devices is selected having regard to water currents, to position the resulting channel such that periodic water currents flow through channel 15 thereby keeping bottom 14*a* of the channel relatively free of silt. As illustrated in FIG. 2, an artificial channel 60 can be formed along a natural channel 42 in waterway 40 by placing a plurality of curtain devices in an end to end arrangement to form substantially parallel chains or series of curtain devices 54 and 56 through natural channel 42. Artificial channel 60 will have opposite ends 50 and 52. The positioning of the series of curtain devices is selected to ensure that a naturally occurring current is formed between ends 50 and 52 which keeps the artificial channel relatively free of silt. Positioning the curtain devices can be done by boat or barge with ends of abutting curtains overlapping thereby creating a funnel effect to enhance the flow of water through the artificial channel. The curtain devices may also, optionally, be physically attached to one another (e.g. by using a linking means such as chains or rope). If curtain devices are linked by attaching abutting floats, to provide additional integrity to the artificial channel, the means of attachment may be selected by one skilled in the art so as not to affect the ability of the float to rotate when responding to changes in water level, caused, for example, by wave action or turbulence.

Figure 4:
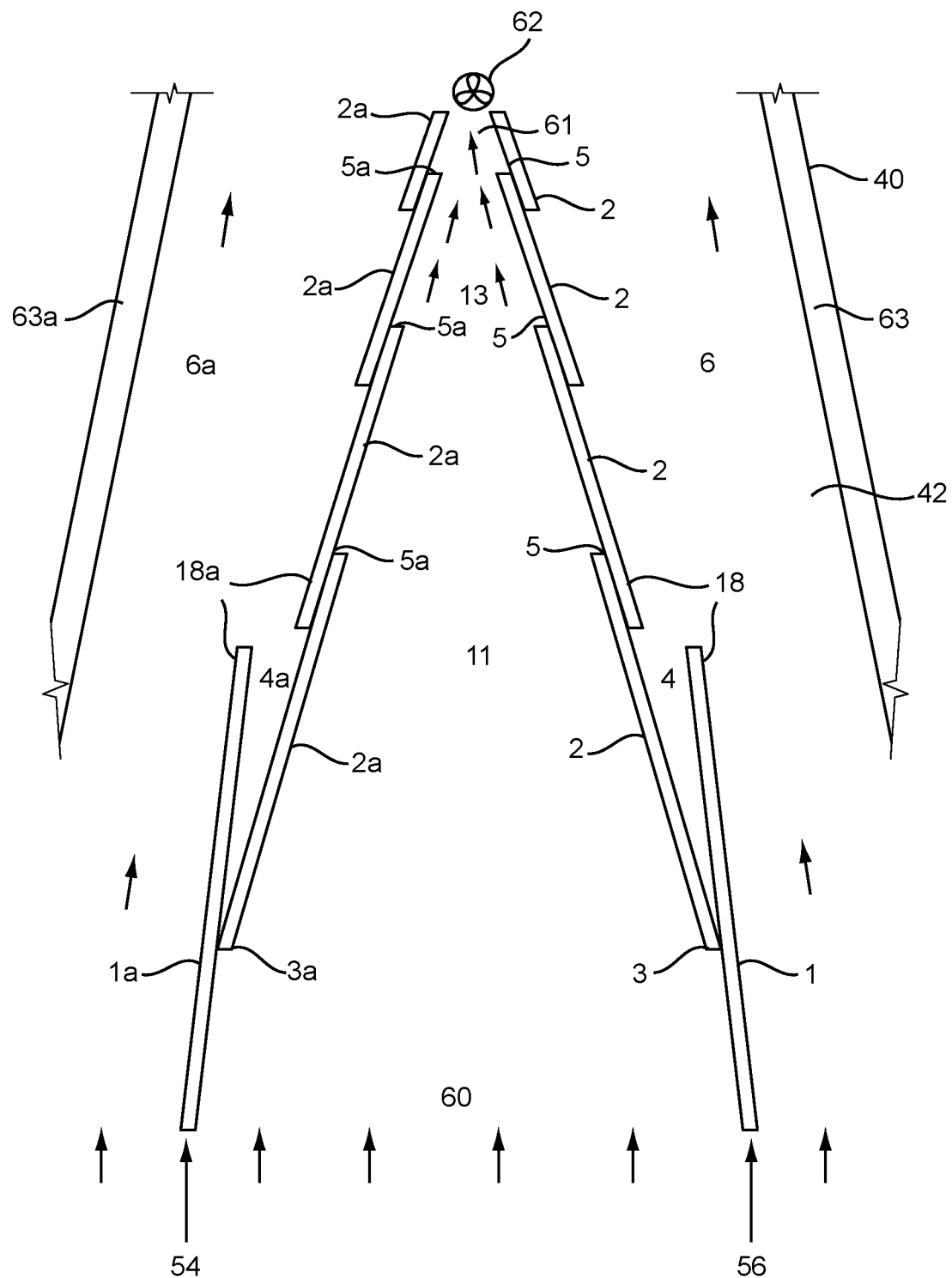
FIG. 4 is a schematic representation of a converging artificial channel constructed using two series of curtain devices according to the disclosure and illustrates the resulting increase in water velocity that can be promoted by such a channel.

In another embodiment, a channel may be formed by creating two series of curtain devices as illustrated in FIG. 4, such that each series 54 and 56 comprises curtain devices generally indicated as 18 and 18*a*. Some of the curtain devices arranged in series are in an abutting, overlapping configuration as illustrated by sequential series of curtain devices 2 and 2*a*. Alternatively, curtain devices may be arranged at an angle relative to one another, as illustrated by the positioning of curtain devices 1 and 1*a* relative to adjacent curtain devices 2 and 2*a*, respectively.

Accordingly, the width and orientation of an artificial channel within a waterway can be established at any given point based on the placement of curtain devices in series and the distance between series of curtain devices. The deployment of curtain devices in series, in abutting, overlapping configurations creates a downstream funnel effect and minimizes leakage in between curtain devices, while also obviating the need for additional connecting means to link one curtain device to another. Even when deploying curtain devices in series in a parallel configuration, collector curtains are effectively established to converge over a greater distance such that the gradual angle of convergence increases the flow of water to a velocity sufficient to transport silt through the artificial channel. The end of the channel can then be extended and "corrected" to a truer parallel configuration once the desired water velocity is attained. The variety of channel configurations with different properties and other advantages are realized as a result of the design of the curtain devices wherein the curtain portion of each device remains substantially taut while the float and weight remain at the top surface and bottom of the waterway, respectively, even when subjected to fluctuations in water levels, caused for example, by increased water volume (flooding) or varying current forces.

FIGS. 7A-E illustrate exemplary artificial channel configurations where the beginning of artificial channel 60 is marked by parallel curtain devices 1 and 1*a* which align with the natural current of the waterway (indicated by the arrow). Collector curtains 2 and 2*a* act to help move silt and debris through an artificial channel and modulate current flow by contributing to a funnel effect. The degree of funnel effect is lessened when pairs of collector curtain devices are positioned in a substantially parallel configuration relative to curtain devices 1 and 1*a* (see FIG. 7A) or to a greater degree when pairs of collector curtain devices are placed in a converging configuration (see FIG. 7B).

Curtain devices 7 and 7*a* set in a parallel configuration relative to one another, mark the channel end 61 and similar to curtain devices 1 and 1*a*, align with the direction of the natural current of the waterway. This serves to maintain the velocity of the current/water flow at that point in the channel (see FIGS. 7B and 7C).

Figure 7A:
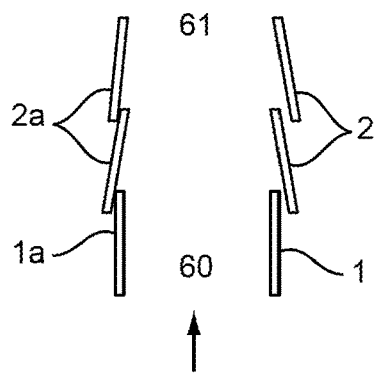
FIGS. 7A-7E are schematic line drawing representations of various embodiments where two series of curtain devices according to the disclosure are applied to form an artificial channel and modulate the rate of water flow and/or direct the deposition of silt that has been carried through an artificial channel formed.
Figure 7B:
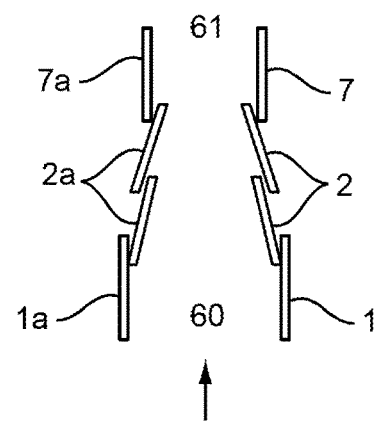
Figure 7C:
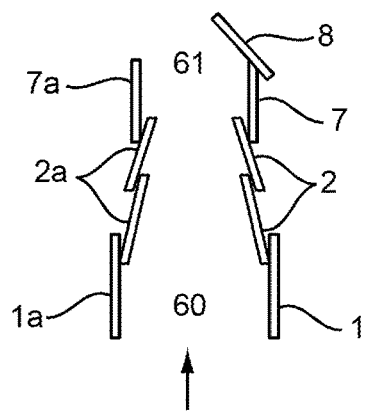
Figure 7D:
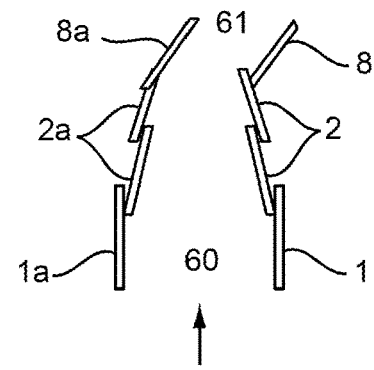
Figure 7E:
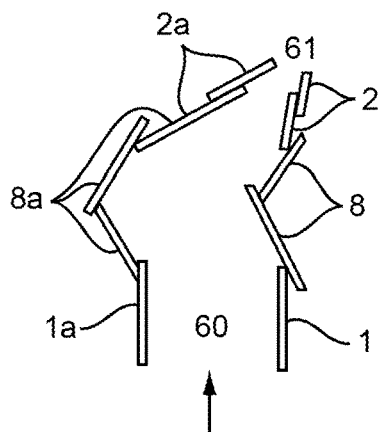

Diverting curtain devices 8 and 8*a* function to change the direction of the channel and current flow relative to the direction of the natural current of the waterway, and thereby also direct the deposition of silt after passing through the artificial channel (see FIGS. 7D and 7E). As illustrated with reference to FIG. 7E, it is possible for one curtain device to serve more than one function within an artificial channel, for example as a both a diverting curtain device 8*a* and collecting curtain device 2*a*.

To control the deposit of silt/debris (sand) when exiting an artificial channel the series of curtain devices would end at a region of the waterway desired for deposits. By extending one side of the channel with additional, curtain devices as shown, for example, in FIG. 7C for a short distance, the moving flow of water will tend to follow the extended series of curtains and the silt/debris deposits will be directed to the opposite side (where the channel has ended) in the slower moving water.

If silt/debris deposits build up beyond a desirable level, or if it becomes desirable to direct further deposits beyond an existing deposit region, additional curtains can be added to both sides of the channel in order to carry deposits farther along to another region or area of the waterway (compare for example, FIG. 7B to 7A).

It may also be advantageous in a given instance, or necessary to pre-position (e.g., turn) the extended or additional curtain devices in different directions (e.g., toward the desirable depositing area) to further modulate/control water velocity and silt/debris fallout (compare, for example, FIGS. 7C-7E, to FIG. 7A).

One skilled in the art will appreciate that the appropriate configuration for a channel and for the modification of a channel to control silt/debris deposits will depend on the composition of the silt/debris and the water velocities that can be achieved with different channel configurations.

The length of a curtain device as defined by the elongated float, the circumference of the float, and absolute height of the curtain portion attached to the elongated float can be determined by one skilled in the art taking into account a number of factors such as:
 a. the depth and known fluctuations of the water levels arising seasonally or as a result of water resource management activities (e.g., damning) in a waterway;
 b. the current characteristics of the waterway (e.g., direction, velocity, etc.); and
 c. the application contemplated for the segregation of bodies of water such as the formation of an artificial channel to facilitate waterway navigation without the build-up of silt.

The selection of the desired circumference, rigidity and material construction of the float will be dictated by its required functions, which may include:
 a. serving as an effective channel surface marker;
 b. providing sufficient surface area to accommodate excess curtain material and help to maintain the curtain in a taut state, when less curtain height is required due to lower water levels; and
 c. maintaining structural integrity and buoyancy after repeated contact with abutting floats and watercraft entering or exiting the channel.

Applications of Curtain Device(s)

The aquatic curtain devices and methods of using the same to create channels in waterways, as provided for herein, have many advantages, applications and uses.

In one embodiment, artificial channels formed using one or more curtain devices are used to facilitate waterway navigation. The artificial channel formed will be clearly marked by the curtain devices, providing a useful navigational aid to boaters. Since the curtain devices are not rigid structures and do not necessitate extraneous hardware (such as chains, clasps, clamps, pins, grommets, etc.) to link them together or anchor them to the bottom of a waterway, no damage will be done to watercraft (e.g., a boat) or to the curtain device in the event a watercraft accidentally crosses over the curtain devices at or near the surface. Moreover, the lack of connecting hardware between individual curtain devices allows for watercraft to easily enter and exit from an artificial channel in between curtain devices aligned in series to form one side of the artificial channel.

Since the aquatic curtains disclosed herein are flexible, they can easily withstand storms and waves without causing the curtain device(s) anchored by the weight(s) to the bottom of waterway to shift significantly from the original position(s) of placement when forming a channel, or to otherwise lose anchorage. In one embodiment, the orientation and positioning of the chains (i.e. series) of curtain devices is selected to create a virtually maintenance free channel which requires minimal, if any, dredging. Such a channel may be permanent or temporary, as required.

In another embodiment, and with reference to FIG. 4, an exemplary system for generating power is illustrated comprising a hydro turbine and an artificial channel made from two series of curtain devices positioned to create the channel 60 converging at end 61. After creating a first portion of the channel 60 using curtain devices 1 and 1*a* oriented in a substantially parallel configuration relative to one another, collector curtains 2 and 2*a* are positioned in an abutting, overlapping configuration to create a funnel effect 11, starting at the points marked as 3 and 3*a*, and ending at the channel's end 61.

In an alternative embodiment additional curtain devices 7 and 7*a* oriented in a parallel configuration relative to one another and with the flow of the current can be added to the converging end of the channel (see FIG. 7A) in order to maintain desired water flow, while still directing the water to a hydro turbine 62. Ending the channel with parallel curtains also restricts the re-entry of silt and similar debris back into the channel when weather conditions lead to turbulent waterway conditions (e.g. on windy days).

One skilled in the art will appreciate that the dimensions and rate of convergence of the channel 60 can be selected and modified to modulate (e.g., increase, maintain, decrease, change the direction of) the water velocity 13 to power an appropriately sized hydro turbine 62. If no power is required the channel configuration can be readily modified to slow the flow of water to below the threshold rate required for the turbine to generate power. In another embodiment, the channel can alternatively be disassembled. In still another embodiment, the path of water flow may be blocked or diverted away from reaching the turbine with the addition of one or more additional curtain devices at the channel end 61.

In one embodiment, the hydro turbine may be permanently housed as part of a power generating station. In another embodiment, the hydro turbine may be a mobile, in stream/river turbine typically used in "small hydro" or "run of river" hydro power generating installations. Exemplary in stream or movable river turbines can be sourced from various manufacturers such as Clean Current Power Systems Inc. and Smart Hydro Power GmbH.

As also shown in FIG. 4, negative waters 4 and 4*a* are effectively created when starting the funnel effect 11 inside the artificial channel 60. These negative waters provide curtain support against the exterior face of the channel curtain to counteract the extra stress (force) applied against the interior face of the channel curtain by starting the funnel effect 11. The slower, more negative moving water 6 and 6*a* similarly provide a backing support for the strings of collector curtain devices 2 and 2*a*. Should a watercraft become engaged with the converging channel and need to exit the channel prior to reaching the hydro turbine, or due to the increasing current velocity, it can do so at points 5 and 5*a* where an end of the float of one curtain device overlaps with the abutting float of an adjacent current device. In this manner, watercraft can elect to continue to navigate the slower waters of a natural channel 42, or be moored along the bank 63 of the waterway 40.

With reference to FIG. 3, the length and angle of placement of each collector curtain device that will promote the desired water velocity to power a given hydro turbine is determined by the buoyancy of the float 20, the strength of the fabric 22 and anchor weight 32.

The ability of the float to stay on the surface while the weight remains on the bottom and the curtain remains taut (despite changing water levels and flow rates), maximizes the ability of the curtain device to redirect water flow from a lesser to a greater degree as needed. Different degrees of water redirection are required to provide, for example, a self-cleaning, silt-free artificial channel (which can accommodate watercraft navigation), direct the deposition of slit from one bottom area of a waterway to another, or modulate current flow for specific applications such as the generation of hydro power.

Strategic placement of the devices allows for other applications such as the prevention of river bank erosion, the prevention of lake shore erosion, the containment and control of environmental spills and the protection and promotion of fish habitats. For example, the placement of diversion curtain devices at the end of a channel as illustrated in FIGS. 7C-7E will cause silt (sand) and similar debris to accumulate on the opposite side, beyond the last curtain device defining the artificial channel to form a sand bar, or environment conducive to fish spawning and wildlife management. Alternatively, when a channel ends with a pair of parallel curtain devices, the silt (sand) and other similar debris will disperse with a mushroom effect and can thus be directed to settle in deeper waters where dredging would not be required or where it would not pose any impediment to watercraft navigation.

Other applications or variations of a shore line or water way conservation nature can be devised by one skilled in the art applying the aquatic curtain devices of the present disclosure to construct artificial channels or otherwise bound off different regions of a waterway.

The disclosures of all patents, patent applications, publications and other information resources referenced in this specification are hereby specifically incorporated by reference in their entirety to the same extent as if each such individual patent, patent application, publication and information resource were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows:

1. A method of forming a channel with an entry point and an exit point for water to flow through the channel in a waterway having a surface, a depth and a bottom, the method comprising the steps of:
   a. providing one or more fixed channel curtain devices, each comprising:
      i. an elongated cylindrical float having a length and a first side;
      ii. an elongated flexible curtain depending from the first side of the elongated cylindrical float and extending along the entire length thereof, the elongated curtain having a bottom end opposite where the elongated curtain depends from the elongated cylindrical float;
      iii. an elongated weight formed on the bottom end of the elongated flexible curtain, the elongated weight extending along the entire length of the elongated cylindrical float and being sufficiently heavy to anchor the fixed channel curtain device to a selected position at the bottom of the waterway;
   b. selecting the height of the elongated flexible curtain of each fixed channel curtain device to remain substantially taut and approximately equal to the depth of the waterway as water levels fluctuate; and
   c. placing each fixed channel curtain device along a desired path to define a part of the channel,
   wherein each fixed channel curtain device is positioned in an end to end, overlapping configuration with other fixed channel curtain devices to form a first series of fixed channel curtain devices defining a length of one side of the channel, such that the elongated cylindrical float of each fixed channel curtain device overlaps with and abuts the elongated cylindrical float of another fixed channel curtain device and wherein the entry point of the channel is directionally coincident with the natural current of the waterway and the channel is configured to direct and modulate the rate of water flow through the channel.

2. The method according to claim 1, wherein the elongated cylindrical float has a second side opposite the first side, an elongated ballast weight being formed on the second side of the elongated cylindrical float.

3. The method according to claim 1, wherein the elongated cylindrical float comprises a cylinder of polyethylene foam.

4. The method according to claim 1, further comprising the steps of providing a second series of fixed channel curtain devices, wherein the two series of fixed channel curtain devices run alongside each other to, respectively, define a length of each side of the channel in the waterway, separated at any given point along the channel by a distance equal to a desired width of the channel at said point.

5. The method according to claim 4, wherein the two series of fixed channel curtain devices are positioned alongside each other in a converging configuration for a length of the channel to increase the velocity of the water running through the channel.

6. The method according to claim 4, wherein the elongated cylindrical float of each fixed channel curtain device in the second series of fixed channel curtain devices overlaps with and abuts the elongated cylindrical float of another fixed channel curtain device.

7. The method according to claim 1, wherein the water is directed to pass through a hydro turbine.

8. The method according to claim 7, wherein the rate of water flow through the hydro turbine is sufficient to generate power.

9. The method according to claim 1, wherein the elongated cylindrical float of each of the one or more fixed channel curtain devices comprises an elongated ballast weight opposite the first side of the elongated cylindrical float, the elongated ballast weight being heavy enough to rotate the elongated cylindrical float for the elongated ballast weight to be under water.

10. The method according to claim 9, wherein the elongated ballast weight, elongated cylindrical float and the elongated flexible curtain of each of the one or more fixed channel curtain devices are configured to permit the elongated cylindrical float to freely rotate between positions where the elongated ballast weight is under water and where it is above water and for the fixed channel curtain device to remain anchored to the selected position at the bottom of the waterway.

11. An artificial aquatic channel constructed within a waterway, comprising an entry point, an exit point, and fixed channel curtain devices positioned in an end to end, overlapping configuration to form a series of fixed channel curtain devices defining a length of one side of the channel in the waterway, wherein the channel is configured to direct and modulate the rate of water flow through the channel; and wherein the water is directed to pass through a hydro turbine.

12. The artificial aquatic channel according to claim 11, wherein each of the fixed channel curtain devices is a device comprising:

a. an elongated cylindrical float having a length and a first side;

b. an elongated flexible curtain depending from the first side of the elongated cylindrical float and extending along the entire length thereof, the elongated curtain having a bottom end opposite where the elongated curtain depends from the elongated cylindrical float;

c. an elongated weight formed on the bottom end of the elongated flexible curtain, the elongated weight extending along the entire length of the elongated cylindrical float, wherein the elongated weight is sufficiently heavy to anchor the device to a selected position at the bottom of the waterway and the elongated cylindrical float is configured to remain at the surface and maintain the elongated flexible curtain substantially taut and at a height approximately equal to the depth of the waterway, as water levels fluctuate.

13. The artificial aquatic channel according to claim 12, wherein the elongated cylindrical float of each fixed channel curtain device overlaps with and abuts the elongated cylindrical float of another fixed channel curtain device.

14. The artificial aquatic channel of claim 12, wherein the elongated cylindrical float of each of the one or more fixed channel curtain devices comprises an elongated ballast weight opposite the first side of the elongated cylindrical float, the elongated ballast weight being heavy enough to rotate the elongated cylindrical float for the elongated ballast weight to be under water.

15. The artificial aquatic channel of claim 14, wherein the elongated ballast weight, elongated cylindrical float and the elongated flexible curtain of each of the one or more fixed channel curtain devices are configured to permit the elongated cylindrical float to freely rotate between positions where the elongated ballast weight is under water and where it is above water and for the fixed channel curtain device to remain anchored to the selected position at the bottom of the waterway.

16. The artificial aquatic channel according to claim 11, further comprising a second series of fixed channel curtain devices, wherein the series of fixed channel curtain devices run alongside each other to, respectively, define a length of each side of the channel in the waterway, separated at any given point along the channel by a distance equal to a desired width of the channel at said point.

17. The artificial aquatic channel according to claim 11, wherein the channel converges to increase the velocity of the water running through the channel.

18. The artificial aquatic channel according to claim 11, wherein the rate of water flow through the hydro turbine is sufficient to generate power.

* * * * *